United States Patent [19]

McGinniss et al.

[11] Patent Number: 4,491,653

[45] Date of Patent: Jan. 1, 1985

[54] CONTROLLED SURFACE-FLUORINATION PROCESS

[75] Inventors: Vincent C. McGinniss, Delaware; Francis A. Sliemers, Columbus, both of Ohio

[73] Assignee: Battelle Development Corporation, Columbus, Ohio

[21] Appl. No.: 501,771

[22] Filed: Jun. 7, 1983

Related U.S. Application Data

[63] Continuation-in-part of Ser. No. 363,065, Mar. 29, 1982, abandoned.

[51] Int. Cl.$^3$ .............................................. C08F 8/22
[52] U.S. Cl. ................................... 525/356; 525/389; 525/390; 525/398; 525/403; 525/410; 525/416; 525/417; 525/418; 525/452; 525/461; 525/471; 525/472; 525/474; 525/480; 525/509; 525/521; 525/523; 525/534; 525/535; 525/538; 525/539; 525/540; 536/56
[58] Field of Search ............... 525/356, 389, 390, 398, 525/403, 410, 416, 417, 418, 452, 461, 471, 472, 474, 480, 509, 521, 523, 534, 535, 538, 539, 540; 536/56

[56] References Cited

U.S. PATENT DOCUMENTS

| | | | |
|---|---|---|---|
| 2,129,289 | 9/1938 | Soll | 525/356 |
| 3,758,450 | 9/1973 | Margrave et al. | 525/356 |
| 4,020,223 | 4/1977 | Dixon et al. | 428/224 |
| 4,076,916 | 2/1978 | Lagow | 526/43 |
| 4,142,032 | 2/1979 | D'Angelo | 526/43 |
| 4,264,750 | 4/1981 | Amond et al. | 525/356 |
| 4,296,151 | 10/1981 | Boultinghouse | 427/255.1 |

*Primary Examiner*—Joseph L. Schofer
*Assistant Examiner*—Bernard Lipman
*Attorney, Agent, or Firm*—Mueller and Smith

[57] ABSTRACT

Disclosed is a method for fluorinating the surface of a polymeric solid for improving a surface property of such solid while substantially maintaining the bulk physical properties of said solid. This method comprises contacting the polymeric solid with dilute fluorine gas at a temperature not substantially above about room temperature and at a pressure not substantially above about 1 atmosphere for a time adequate to partially fluorinate said solid surface by forming stable fluorocarbon groups wherein the ratio of —CF$_2$— groups to —CHF— groups is not substantially above about 1:1, the proportion of oxygen-providing groups presend during said fluorination being restricted to an amount whereby substantially no oxidation of said surface occurs.

9 Claims, No Drawings

CONTROLLED SURFACE-FLUORINATION PROCESS

The Government has rights in this invention pursuant to Contract No. DAAK11-810039 awarded by the U.S. Army Armament Research and Development Command.

CROSS-REFERENCE TO RELATED APPLICATIONS

This application is a continuation-in-part of application Ser. No. 06/363,065, filed on Mar. 29, 1982 now abandoned.

BACKGROUND OF THE INVENTION

The present invention is directed to the surface modification of solid polymeric substrates and more particularly to controlled surface fluorination thereof.

Synthetic polymers and plastics provide the basis for a large part of consumer and industrial products encountered presently and likely will increase in the future. Polymeric solids, for present purposes, comprehends an object constructed from, coated with, or otherwise composed of a polymer in solid form. Examples of such polymeric solids include, for example, synthetic fibers for clothing, polyvinyl chloride (PVC) and like plastic storage bags (eg. blood bags), polycarbonate safety glasses, to name but just a few of such items. Such polymeric solids are chosen for an intended use because of particular bulk properties which they possess. That is, particular polymeric solids possess good tensile strength, desirable oxygen permeability capabilities, high impact resistance, resistance to corrosion, good optical properties, and a variety of other properties. While the bulk properties of such polymeric solids may be quite good, the outer surface of such polymeric solids often can be degraded or eroded by a variety of conditions encountered in every-day use. That is, some polymeric solids while providing good tensile strength, may become easily soiled and scratched, while other polymeric solids of good optical transmissivity can become easily soiled and are resistant to cleaning. Other polymeric solids may be subject to the phenomena known as plasticizer migration. It will be seen that the polymeric solids require a surface treatment in order to materially enhance their durability in every-day use.

One such surface treatment proposed in the art comprises subjecting the polymeric solid to a fluorine-containing source in order to surface-fluorinate the polymeric solid. For example, U.S. Pat. No. 4,296,151 proposes to treat normally solid polymers of aliphatic mono-1-olefins and elastomeric and resinous polymers of conjugated dienes and vinyl-substituted aromatic compounds with fluorine gas in order to render the surface water-wettable and resistant to hydrocarbons, thus improving the printability of the treated solid. U.S. Pat. No. 4,264,750 discloses the use of cold plasma fluorination techniques to completely fluorinate a hydrocarbon or amide polymer. Such cold plasma process is conducted with various fluorine-containing gases in the substantial absence of oxygen. U.S. Pat. No. 4,120,032 proposes an improved barrier coating polymeric film by treating such film with combination of fluorine and bromine. U.S. Pat. No. 4,076,916 conducts the fluorination of polymers by contacting the polymer initially with dilute fluorine gas (eg. 6%) followed by the gradual increase in fluorine concentration. U.S. Pat. Nos. 3,758,450 and 3,775,489 disclose surface fluorination processes utilizing such fluorination process. U.S. Pat. No. 4,020,223 proposes to fluorinate polyolefin and polyacrylonitrile fiber form by treating such fiber form with elemental fluorine in the presence of low amounts of oxygen.

While control of the fluorination reaction is an object within each of these prior art proposals, none of such proposals recognizes any universality in the surface fluorination process for virtually all types of polymeric solids. Moreover, no apparent predictability in the fluorination processes of the prior art is readily apparent. The present invention, however, provides an analysis of the chemical reactions occurring at the surface of the polymeric solids during the fluorination process and provides limitations thereon for achieving improved surface properties of the solid while substantially maintaining the bulk physical properties of the polymeric solid itself.

BROAD STATEMENT OF THE INVENTION

The present invention is a method for fluorinating the surface of a polymeric solid for improving a surface property of such solid while substantially maintaining the bulk physical properties of said solid. Such method comprises contacting the polymeric solid with dilute fluorine gas at a temperature not substantially above about room temperature and at a pressure not substantially above about one atmosphere for a time adequate to partially fluorinate the solid surface by forming stable fluorocarbon groups wherein the ratio of $-CF_2-$ groups to $-CHF-$ groups is not substantially above about 1:1. Where the absence of flex-crazing or the degree of optical clarity (transmissivity) are important surface properties, there should be substantially no $-CF_2-$ groups formed. The proportion of oxygen-providing compounds (eg. molecular oxygen or air) present during the fluorination process is restricted to an amount such that substantially no oxidation of the polymeric solid surface occurs. Representative dilute fluorine gas concentrations generally are less than about 4% by volume with contact times generally ranging from about 1-30 minutes.

Advantages of the present invention include the ability to improve the surface properties of the solid without deleteriously effecting the bulk physical properties of the solid which make it advantageous for particular uses. Additionally, a method for pre-determining the desirable fluorine level to which the surface of the polymeric solid should be fluorinated is disclosed. These and other advantages of the present invention readily will become apparent based upon the disclosure contained herein.

DETAILED DESCRIPTION OF THE INVENTION

The ultimate goal achieved by the present invention is the improvement of a surface property of a polymeric solid by surface fluorination techniques wherein the bulk physical properties of the solid are substantially maintained. Surface properties of polymeric solids which may be improved according to the precepts of the present invention include, for example, providing improved dirt resistance, better washability, improved bondability, improved printability, reduced friction and wear characteristics, and a variety of additional surface properties. Improving such surface properties of polymeric solids, though, has been within the grasp of the prior art to a limited extent; however, such art sacrificed important bulk physical properties of the polymeric solid in an attempt to improve the surface properties thereof. It is the achievement of both improved surface properties and retention of bulk physical properties that is accomplished according to the precepts of the present invention. Based upon the outlined goal, several fundamental discoveries and realizations occurred during the course of developing the present invention. Several of these realizations are limiting cases which form a framework within which the present invention is operable.

One discovery or realization is that a polyvinyl fluoride (PVF) polymeric solid does not meet the criteria established. Thus, the fluorination reaction should not be conducted to an extent wherein virtually all reactive carbon atoms in the polymeric solid contain a fluorine atom. A second realization or discovery is that excess polyvinylidene fluoride also does not meet the criteria established for the present invention. That is, as low as a 20 percent content of —$CF_2$— groups on the surface of a polymeric solid causes the polymeric solid to experience loss of some properties that also are lost when virtually all carbon atoms are difluorinated. It will be demonstrated that —$CF_2$— groups generally render the surface of the polymeric solids to have poor bondability, poor printability, etc.; and can deleteriously affect bulk physical properties by reducing optical properties, decreasing flexibility especially at lower temperatures, and like loss of valuable properties. Thus, especially when optical properties and flexibility of substrates are important considerations, the fluorination should be conducted to the substantial exclusion or minimization of —$CF_2$— group formation in favoe of —CHF— group formation.

When optical properties, flexibility, bondability, printability and like properties noted above are not the bulk and surface properties of interest, some —$CF_2$— group formation can be permitted to occur. That is, when the surface of the polymeric solid is to be modified for improvement of its resistance to dirt, scratching, or the like, control of the ratio of —$CF_2$— groups to —CHF— groups has been discovered to be the important variable with respect to maintaining the bulk physical properties of the solid while improving such surface properties. This balancing of bulk and surface properties is achieved by conducting the fluorination such that the ratio of —$CF_2$— groups to —CHF— groups is not substantially above about 1:1. If this ratio substantially exceeds 1:1, important bulk properties of the polymeric solid may be lost. At ratios of less than 1:1, improvement of surface properties is achieved while preservation of bulk properties is maintained. Accordingly, depending upon the particular composition of the polymeric solid of interest and depending upon the desired surface and bulk properties desired, the limiting proportion of —$CF_2$— group formation will vary between 0 and an amount whereby the indicated —$CF_2$— to —CHF— ratio does not substantially exceed 1:1.

Finally, the relationship between oxygen-providing compounds (eg. molecular oxygen or air) and fluorination of polymeric solids has been defined. It has been discovered that the presence of oxygen, for example in the form of air, even at nominal low proportions will cause significant oxidation of the polymeric solid surface which apparently is catalyzed or enhanced by the presence of fluorine gas. Another important discovery in this regard is the apparent instability of fluorine group formation which occurs during such oxidation/fluorination process. It will be shown in the Examples that significant proportions of the resulting fluorinated groups are unstable and can be readily removed by water washing, for example. Thus, where the proportion of oxygen is adequate to cause oxidation of the surface of the polymeric solid, lower proportions of fluorine groups are formed and a significant proportion of such groups are unstable and can be readily removed. This is very important also in regard to the depth of fluorination which occurs during the process. That is, long term stability and utility of the fluorinated polymeric solids necessarily must account for a certain amount of surface errosion due to normal everyday use of the polymeric solid. As small layers of the surface are erroded or worn away, the exposed surface then controls the desired surface properties of the substrate. Thus, at least for a certain distance within the polymeric solid, eg. about 100 A or thereabouts, it is desirable that the fluorination penetrate into the substrate to form some fluorocarbon groups. The presence of an adequate proportion of oxygen to cause oxidation of the surface also substantially inhibits the penetration of fluorine into the substrate for formation of fluorocarbon groups. The process of the present invention, however, permits retention of a significant proportion of fluorine content into the substrate for providing longer wear and effectiveness of the substrate over time. The proportion of oxygen or other oxygen-providing compound present during the fluorination process, then, is defined functionally in that substantially no oxidation of the polymeric surface results by that proportion of oxygen present.

Accordingly, the process of the present invention desirably is operated at room temperature, at a fluorination pressure of not substantially above about one atmosphere, preferably with a fluorine gas of less than about 4% concentration in an inert carrier gas, with fluorination times of 1–30 minutes generally practiced. By operating within the precepts of the present invention, and preferably under the preferred operating conditions noted above, the surface of a polymeric solid can be partially fluorinated to form —CHF— groups with control of —$CF_2$— group formation to achieve advantageous surface property modification without sacrifice of the bulk physical properties which led to the initial selection of the particular polymeric solid being subjected to the treatment. It must be recognized that the fluorinating agents, especially those that are mild and selective towards —CHF— formation, may be useful in the process of the present invention. As the Examples will demonstrate, the presence of water vapor does not adversely affect operation of the present invention, as some prior art has taught.

Thus, the process of the present invention may be termed as an extra dilute phase fluorination reaction, though such characterization should not be construed as a limitation of the present invention. Diluent carrier gases for the fluorine gas include, for example, nitrogen, rare or noble gases such as neon, argon, helium, and the like, and like non-reactive diluent gases. High pressure and high temperature conditions are to be avoided in order to ensure the control of —$CF_2$— group formation. As noted above, the reaction time advantageously ranges from about 1–30 minutes, though the polymeric solid of choice, proportion of fluorine gas, reaction temperature and reaction pressure are variables which necessarily will impact the fluorination reaction time which should be practiced.

Polymeric solids which may be subjected to the dilute phase surface fluorination process of the present invention include, for example, polymeric solids formed from silicone resins, phenolic resins, polyolefins, polyvinyls, polyesters, polyacrylates, polyethers, polyamides, polysulfones, cellulosic materials, polycarbonates, polyepoxides, polyacrylonitriles (PAN), and a wide variety of other polymeric solids. The polymeric solids may be in the form of sheets or webs, in fiber form, or in any other convenient shape or form as use of such polymeric solids dictates. Such polymers for forming the polymeric solid optionally may be substituted with a variety of substituents and such substituents generally do not adversely affect the surface modification or treatment of the present invention. Such substituents may include, for example, carboxyl, amine, sulfate, halide, silicone, and the like. It must be cautioned, though, that such substituents may be displaced preferentially by the fluorine during the reaction and this must be taken into account in designing the fluorination process for the particular polymeric solid of choice. It is worth noting also that the fluorination process apparently provides a degree of sterilization to the polymeric solid which property may be advantageously exploited in certain applications, eg. fluorination of polymeric solids intended for medical use.

It would be desirable to be able to correlate a defined or easily experimentally determined variable during the course of the surface fluorination process to the treatment being effected to the polymeric surface, even though such indicia is not the precise modification variable sought to be improved. So long as a relationship between the indicia and the ultimate property can be determined, the monitoring of such indicia becomes important. As general propositions of results achieved through surface fluorination techniques, the surface fluorination of a polymeric solid results in an increase in density with a corresponding decrease of oxygen permeability. Oxygen permeability is believed to be a convenient indicia correlative to the surface modification being affected according to the process of the present invention. A decrease in the refractive index also is believed to be an important indicia correlative to the surface fluorination process also. It is believed that such oxygen permeability variable can be correlated to other surface properties which may be of interest in achieving by the fluorination techniques evolved by the present invention. Two general techniques have been evolved for correlating the surface fluorination to the oxgen permeability of the modified polymeric solid. In this connection reference is made to Salame, "A CORRELATION BETWEEN THE STRUCTURE AND OXYGEN PERMEABILITY OF HIGH POLYMERS", ACS-Polymer Preprints, Vol. 8, No. 1, pp. 137-144 (1967). The Permachor relationship developed by Salame provides a direct correlation between the structural units of the modified surface and the oxygen permeability thereof. By utilizing the Permachor relationship and the degree of —CHF— formation, the oxygen permeability can be determined ahead of time for any polymeric solid of interest. The oxygen permeability, then, can be related to other surface properties which are of interest. In order to more fully understand this relationship, the following data relating types of fluorinated groups to oxygen permeability is given.

| Structural Unit | Oxygen Permeability $P \times 10^{12}$ cc cm cm$^2$ sec cm-Hg | % CH$_2$ Groups | % Halogen Groups |
|---|---|---|---|
| CH$_2$—CH$_3$ | 66-83 | 100 | 0 |
| CH$_2$—CHF | 20 | 47 | 43% CHF |
| CH$_2$—CHCl | 4.80 | 42 | 58% CHCl |
| CH$_2$—CF$_2$ | 2.40 | 41 | 59% CF$_2$ |
| CF$_2$—CFCl | 1.80 | 0 | 43% CF$_2$ 47% CFCl |
| CF$_2$—CF$_2$ | 0.40 | 0 | 100% CF$_2$ |

As the above information demonstrates, surface fluorination dramatically affects the oxygen permeability of polymeric solids. Not seen in the above-tabulated data is the deleterious affect which —CF$_2$— groups can have on the bulk physical properties of the fluorinated polymer if their presence is not controlled.

Yet another method for correlating the degree of surface fluorination to the oxygen permeability of the fluorinated substrate involves the use of the McGinniss predictive equation as set forth in the following publications: ACS-Organic Coatings and Plastics Chemistry, Vol. 39, pp 529-534 (1978) and ACS-Organic Coatings and Applied Polymer Science, Vol. 46, pp 214-223 (1981). The McGinniss predictive relationship, as it relates to oxygen permeability and surface fluorination techniques, states that the oxygen permeability of a surface fluorinated polymeric solid can be determined and predicted based upon the refractive index of the polymer and the density of the polymer. Specifically, the product of the refractive index (n) and the density (d) is directly proportional to the oxygen permeability, which according to work on the present invention is proportional to other surface properties of interest of fluorinated polymeric solids. In order to more fully understand the McGinniss predictive relationship in the context of the present invention, the following data based thereon is given:

| Polymer Type | Oxygen Permeability $P \times 10^{12}$ cc cm cm$^2$ sec cm-Hg | Refractive Index (n) | Density (d) | n.d Product |
|---|---|---|---|---|
| Polyvinyl dichloride | 0.30 | 1.6 | 1.66 | 2.66 |
| Polydifluoroethylene (Teflon) | 0.40 | 1.35 | 2.0 | 2.70 |
| CF$_2$—CFCl | 1.80 | 1.43 | 1.92 | 2.75 |
| Polyvinylidene fluoride | 2.40 | 1.42 | 1.74 | 2.47 |
| Polyvinyl chloride | 4.8 | 1.539 | 1.385 | 2.13 |
| Polyvinyl fluoride | 20.0 | 1.37 | 1.46 | 2.0 |
| Polyvinyl acetate | 36.0 | 1.467 | 1.19 | 1.74 |
| Polystyrene | 54.0 | 1.591 | 1.13 | 1.80 |
| Polyethylene | 36.0 | 1.52 | 1.0 | 1.52 |

| Polymer Type | Oxygen Permeability $P \times 10^{12}$ $\frac{cc\ cm}{cm^2\ sec\ cm\text{-}Hg}$ | Refractive Index (n) | Density (d) | n.d Product |
| --- | --- | --- | --- | --- |
| Polypropylene | 137.0 | 1.49 | 0.85 | 1.27 |

As the above data demonstrates, the oxygen permeability of the polymeric solids are directly proportional to the product of the refractive index and the density of the polymeric solids. Thus, two different methods for determining the oxygen permeability of a fluorinated polymeric solid are given. Use of the process of the present invention to fluorinate the polymeric solid to such fluorine content, then can be conducted. Such oxygen permeability also can be directly related to other surface properties which may be of interest. Also, the use of Permachor relationship and the McGinniss predictive relationship provides valuable information as to whether a desired property for a given polymeric solid can be achieved without substantially harming the bulk physical properties of the polymeric solid. If the surface modification requires the formation of —$CF_2$— groups, it now is known that loss of valuable bulk physical properties of the polymeric solid can be expected. A different choice of polymer, then, may be dictated.

The following examples show in detail how the present invention can be practiced but should not be construed as limiting. In this application, all units are in the metric system and all percentages and proportions are by weight, unless otherwise expressly indicated. Also, all references cited herein are expressly incorporated herein by reference.

IN THE EXAMPLES

Fluorination reactions were carried out in a 1 liter or 2 liter reaction cell under very dilute fluorination conditions at room temperature (ca. 21° C.) and at a total pressure of 1 atmosphere or less. The inert diluting gas in all experiments was nitrogen and the dilute fluorinating gas contained 15% $F_2$ and 85% $N_2$ (supplied by Matheson Division of Searle Medical Products). Typical dilute fluorination for the 1 liter cell was practiced as follows:

(1) the solid polymer sample was placed into the cell and the cell evacuated to about 1.8 mm of $H_2O$ (about 25 inches of water) with a water aspirator or to 1-2 mm of $H_2O$ (about 30 inches of water) with a vacuum pump;

(2) the evacuated cell was filled to 50% of its volume with $N_2$ ($O_2$ free);

(3) the partially pressurized cell then was filled with the dilute fluorinating gas to 17% of the cell volume, then additional $N_2$ was charged to establish 1 atmosphere in the cell, and the cell held at room temperature for 1-60 minutes depending upon the degree of surface fluorination desired; and (4) the cell was evacuated and the surface fluorinated sample was removed. The total fluorine content in the cell was about 2.55%.

Plasticizer migration evaluation of surface fluorinated polyvinyl chloride (PVC) films were determined from weight loss measurements of the sample films before and after being subjected to vacuum treatment at 65° C. for various time intervals noted in the examples. Optical properties were determined by visual inspection.

EXAMPLE 1

A mixture of a clear ethylene propylene diene monomer rubber (EPDM, Nordel 1320 rubber, E. I. DuPont De Nemours, Company), 5-20 parts of silica, 2% A-174 coupling agent by weight of the silica (A-174 coupling agent is a silane coupling agent, supplied by Union Carbide Corporation), 10 parts of a multifunctional acrylate (Sartomer 350 is trimethylolpropane trimethacrylate), and 3 parts of ditert-butyl peroxide were cured at 160° C. for 30 minutes. The cured EPDM film was subjected to the fluorination process described for 2 minutes (Sample 1). Another sample was subjected to the fluorination process for 30 minutes (Sample 2).

Each sample was subjected to ESCA analysis (Electron Spectroscopy for Chemical Analysis) in order to determine the types and concentrations of fluorine groups at the surface of the fluorinated EPDM samples. ESCA analysis of Sample 1 (2 minutes fluorination treatment) showed approximately 20% —CHF— content (binding energy 288 to 289 e.v.) and 80% $CH_3$, $CH_2$, and CH content (binding energy 285–287 e.v.). ESCA examination of Sample 2 showed approximately 20% —$CF_2$— content (binding energy 291.2 e.v.), 20% —CHF— content, and 60% $CH_3$, $CH_2$, CH content.

Each sample and a control (unfluorinated) sample was subjected to optical evaluation in order to determine its percent transmittance of light and its dirt resistance. Dirt resistance, recorded as %-haze on a Gardner Laboratory haze meter, is determined by applying talcum powder to the sample and then dry-wiping the powder from the sample with a tissue paper. The samples also were bent for determining flex crazing which is caused by microcracks or related phenomena such that the bent film becomes visually opaque. The results of these tests are displayed below.

TABLE 1

| Sample No. | % Transmittance | | % Haze | | Flex Crazing |
| --- | --- | --- | --- | --- | --- |
| | Before Talc | After Talc | Before Talc | After Talc | |
| Control | 92–93 | 92–93 | 4–6 | 35–42 | None |
| 1 | 91–93 | 91–93 | 4–6 | 12–20 | None |
| 2 | 91–93 | 91–93 | 9–16 | 16–22 | Severe |

These results demonstrate that the dirt resistance of EPDM samples can be improved significantly by surface fluorination; however, the desirable bulk properties of good optical performance even under flex stress conditions are lost when —$CF_2$ groups are introduced at the surface. Partial fluorination to form only —CHF— groups, though, yielded improved dirt resistance while maintaining optical performance and flexibility of the EPDM rubber.

EXAMPLE 2

Thin-film samples of a plasticizer PVC film (20–40 mils, ¾" by 2", Shamrock 426 PVC film containing 50% by weight bis(2-ethylhexyl) phthalate plasticizer, Diamond Shamrock Corporation) were placed inside of the fluorination cell and subjected to dilute fluorination as described before. Reaction times varied for each sample. Each condition was repeated three times with placement of the sample in three different locations in the cell (top, middle, and bottom) in order to determine whether any significant gradient existed in the cell. Thereafter, the samples were subjected to plasticizer migration analysis as described above. The results of these studies are displayed in the following table.

TABLE 2

| Sample No. | Fluorination Time (min.) | Plasticizer Loss at 65° C. in VACUO, DAYS (wt %) | | | | | | |
|---|---|---|---|---|---|---|---|---|
| | | 1 | 3 | 7 | 10 | 14 | 28 | 56 |
| Control | | | | | | | | |
| 1 | — | 0.61 | 1.41 | 3.03 | 4.05 | 5.55 | 11.07 | 20.0 |
| 2 | — | 0.43 | 1.01 | 2.03 | 3.13 | 4.12 | 6.91 | 17.8 |
| Avg. | — | 0.52 | 1.21 | 2.53 | 3.59 | 4.84 | 8.99 | 18.9 |
| A | | | | | | | | |
| Top | 3 | 0.75 | 1.32 | 2.48 | 3.03 | 4.40 | 8.87 | 16.8 |
| Middle | 3 | 0.66 | 1.40 | 2.01 | 2.98 | 4.23 | 6.72 | 17.7 |
| Bottom | 3 | 0.79 | 1.09 | 2.41 | 3.43 | 4.66 | 9.97 | 18.3 |
| Avg. | 3 | 0.73 | 1.27 | 2.30 | 3.15 | 4.43 | 8.52 | 17.6 |
| B | | | | | | | | |
| Top | 5 | 0.64 | 1.23 | 2.19 | 2.79 | 3.60 | — | — |
| Middle | 5 | 0.37 | 0.81 | 1.61 | 2.31 | 2.79 | 5.28 | 15.2 |
| Bottom | 5 | 0.98 | 1.59 | 2.69 | 3.24 | 4.24 | 7.73 | 17.3 |
| Avg. | 5 | 0.66 | 1.21 | 2.16 | 2.78 | 3.54 | 6.51 | 16.3 |
| C | 60 | Sample Degraded | | | | | | |

The above-tabulated results demonstrate that plasticizer migration can be suppressed by the dilute fluorination process of the present invention. The rate of fluorination loss for the control samples was 0.33%/day, for sample A the rate of loss was 0.30%/day, and for sample B the rate of loss was and 0.28%/day. Thus, there is an average of 9% improvement in plasticizer loss for sample A and 15% improvement for sample B compared to the control samples. These results also show that no significant fluorination gradient is apparent in the cell. Note that even under the dilute fluorination conditions established in the cell, the sample held in the cell for 60 minutes degraded.

EXAMPLE 3

EPDM rubbers were prepared according to recipes described in *ELASTOMERS*, pp 22–29, Palmerton Publishing Co., Atlanta, Georgia (April, 1979) and pp 28–34 (January, 1982). These recipes included 100 parts Nordel 1440 or 2722 EPDM rubber, 50–100 parts filler, and 2–8 parts dicumyl peroxide. Fluorination of these rubbers was carried out for 2 minutes (Sample 1), 3 minutes (Sample 2), and 60 minutes (Sample 3). Coefficient of friction ($\mu$) measurements then were made on a control sample (unfluorinated) and the fluorinated samples in accordance with ASTMD-1895-69, part 35 (1980) and wear life conditions were determined under ASTM D-3702 part 25. Further discussions on this subject can be found by Savkoor, *ACS-Coatings and Plastics Preprints*, Vol. 34, No. 1, pp 220–229 (1974). The following results were obtained.

TABLE 3

| Sample No. | Coefficient of Friction ($\mu$) | |
|---|---|---|
| | Initial | Final After 60 min. of Wear |
| Control | 1.1 | 0.71 |
| 1 | 0.46 | 0.53 |
| 2 | 0.59 | 0.68 |
| 3 | Sample cracked and lost all flexibility | |

These results show that the surface fluorination process improves friction and wear characteristics provided that —$CF_2$— formation is avoided.

EXAMPLE 4

Three different substrates were fluorinted in accordance with the invention and in accordance with Dixon, U.S. Pat. No. 4,020,223. The Dixon fluorination process utilizes a controlled amount of fluorine and air (oxygen) in a ratio of 1:5 $O_2/F_2$ or less with $F_2$ ranging from 1–5% and $O_2$ ranging from 0.2–5%. Dixon notes that carbonyl groups are formed during the process and that water washing depletes fluorine from the treated substrates. The following fluorination conditions were used:

| | Invention | Dixon-1 | Dixon-2 |
|---|---|---|---|
| % $F_2$ | 2.4 | 2.4 | 2.4 |
| % $O_2$ | — | 3.0 | 1.4 |
| $O_2/F_2$ | 0 | 1.25 | 0.58 |
| Time (min) | 3 | 3 | 3 |

Following the three minute fluorination treatment, the cell was purged with $N_2$ for an additional 5 minutes and the samples removed from the cell.

The substrates treated were polypropylene, EPDM rubber and polycarbonate. Some of the fluorinated samples were washed with room temperature water following treatment. Each sample was subjected to ESCA analysis at the surface (1 $cm^2$ square by 20 Å deep). The sites then were subjected to argon sputtering to an additional 30 Å depth and ESCA analysis again performed.

The following results were recorded.

TABLE 4A

| | | Control (wt %) | | Inventive | | | | Dixon-1 | | | | Dixon-2 | |
| | | | | No Air/No Wash (wt %) | | No Air/Wash (wt %) | | Air/No Wash (wt %) | | Air/Wash (wt %) | | Low Air/No Wash (wt %) | |
| Substrate | Comp. | Before | Sputter | Before | Sputter | Before | Sputter | Before | Sputter | Before | Sputter | Before | Sputter |
| Poly- | C | 84.9 | 98.9 | 54.4 | 87.7 | 51.2 | 87.2 | 55.9 | 96.0 | 62.2 | 92.5 | 54.7 | 96.0 |
| Propylene | F | — | — | 38.7 | 11.2 | 39.6 | 12.8 | 28.6 | 2.8 | 24.3 | 5.0 | 31.6 | 2.9 |
| | O | 10.8 | 1.1 | 6.9 | 1.1 | 9.2 | — | 15.4 | 1.2 | 13.5 | 2.5 | 13.7 | 1.1 |
| | N | 4.5 | — | — | — | — | — | — | — | — | — | — | — |
| EPDM | C | 83.6 | 94.1 | 48.1 | 90.7 | 45.3 | 87.0 | 50.7 | 94.1 | 61.6 | 90.2 | 53.2 | 97.7 |
| | F | — | — | 41.2 | 7.1 | 44.0 | 10.1 | 28.2 | 3.0 | 22.4 | 5.4 | 26.2 | — |
| | O | 10–16.4 | 5.9 | 10.7 | 2.2 | 10.7 | 2.9 | 21.2 | 2.9 | 16.0 | 4.4 | 20.6 | 2.3 |

TABLE 4A-continued

| | | Control (wt %) | | Inventive | | | | Dixon-1 | | | | Dixon-2 | |
| | | | | No Air/No Wash (wt %) | | No Air/Wash (wt %) | | Air/No Wash (wt %) | | Air/Wash (wt %) | | Low Air/No Wash (wt %) | |
| Substrate | Comp. | Before | Sputter | Before | Sputter | Before | Sputter | Before | Sputter | Before | Sputter | Before | Sputter |
|---|---|---|---|---|---|---|---|---|---|---|---|---|---|
| Poly-Carbonate | C | 77.1 | 94.1 | 50.0 | 80.0 | 40.3 | 81.1 | 49.7 | 91.9 | 65.8 | 97.9 | | |
| | F | — | — | 38.6 | 18.1 | 43.6 | 18.0 | 29.5 | 4.3 | 18.0 | — | | |
| | O | 22.9 | 5.9 | 11.4 | 1.1 | 9.9 | 0.9 | 20.8 | 3.8 | 16.2 | 2.1 | | |

TABLE 4B

| | | Inventive | | | | Dixon-1 | | | | Dixon-2 | |
| | | No Air/No Wash (wt %) | | No Air/Wash (wt %) | | Air/No Wash (wt %) | | Air/Wash (wt %) | | Low Air/No Wash (wt %) | |
| Substrate | Comp. | Before | Sputter | Before | Sputter | Before | Sputter | Before | Sputter | Before | Sputter |
|---|---|---|---|---|---|---|---|---|---|---|---|
| Poly-Propylene | $CF_3$ | 13.5 | — | 18.2 | — | 12.9 | — | 10.6 | — | 15.1 | — |
| | $CF_2$ | 45.0 | — | 36.5 | — | 36.8 | — | 32.8 | — | 34.1 | — |
| | CHF | 41.3 | 6.2 | 45.3 | 8.4 | 50.2 | 3.0 | 56.6 | 4.0 | 50.8 | — |
| EPDM | $CF_3$ | 20.6 | — | 25.6 | — | 15.6 | — | 8.0 | — | 15.8 | — |
| | $CF_2$ | 39.9 | — | 35.6 | — | 35.7 | — | 22.8 | — | 32.0 | — |
| | CHF | 34.0 | 18.0 | 38.9 | 20.0 | 48.7 | 4.6 | 21.8 | 5.4 | 52.2 | 4.4 |
| Poly-Carbonate | $CF_3$ | 23.0 | — | 32.0 | — | 10.0 | — | — | — | | |
| | $CF_2$ | 44.0 | 4.4 | 33.0 | 6.9 | 46.6 | — | 6.7 | — | | |
| | CHF | 28.0 | 27.0 | 33.0 | 21.1 | 43.4 | 14.9 | 29.0 | — | | |

Several important observations can be made based on the above-tabulated data:

(1) The inventive process yielded no surface oxidation, whereas the Dixon process did.
(2) The inventive process yielded higher surface fluorination concentrations than did the Dixon process.
(3) The surface fluorine of the inventive process was stable to water washing, whereas the surface fluorine of the Dixon process was not stable to water washing.
(4) The fluorine content into the substrate was higher by the inventive process than by the Dixon Process.

The foregoing observations underscore the uniqueness of the inventive fluorination process.

EXAMPLE 5

The following performance evaluation of the fluorinated samples of Example 4 was undertaken:

Contact Angle

The angle of incidence between the substrate and one drop of water was measured initially and after 5 minutes. The difference between these values was determined and recorded.

Stain Resistance

A 1% filtered solution of methyl red sodium salt in water was dropped onto the substrate and covered with a cover glass for 24 hours. The area then was rinsed with water and the area visually inspected to ascertain the strain resistance of the substrate.

Haze Test

The %-haze of the substrates was determined in accordance with the procedure of Example 1.

Scratch Resistance

Each substrate was subjected to 000 steel wool double rubs until the haze value was between 40 and 45. The resistance to scratching then was calculated by dividing the final haze value by the number of double rubs required to reach such final haze value.

The following abbreviations are used in the table for brevity and clarity.
Inventive-no air/no wash: I1
Inventive-no air/wash: I2
Dixon 1-air/no wash: D1-A
Dixon 1-air/wash: D1-B

TABLE 5

| Substrate | | % $O_2$ | $CF_2$/CHF | Contact Angle | Stain Resist. | %-Haze | Scratch Resist. |
|---|---|---|---|---|---|---|---|
| Poly-propylene | Control | — | — | — | — | 9–11 | 48.3 |
| | I1 | 6.9 | 1.10 | 18 | Good | 15.3 | 11.4 |
| | I2 | 9.2 | 0.81 | 15 | Good | 15.1 | 16.2 |
| | D1-A | 15.4 | 0.73 | 20 | Poor | 12.1 | 21.4 |
| | D1-B | 13.5 | 0.58 | 21 | Poor | 11.8 | 43.7 |
| EPDM | Control | — | — | — | — | 4–7 | 5.63 |
| | I1 | 10.7 | 1.17 | 16 | Good | 10–12 | 1.12 |
| | I2 | 10.7 | 0.92 | 18 | Good | 5 | 1.05 |
| | D1-A | 16.0 | 1.04 | 19 | Poor | 7–9 | 1.25 |
| | D1-B | 21.0 | 0.73 | 25 | Poor | 5 | 1.36 |
| Poly-carbonate | Control | — | — | — | — | 0.1 | 7.58 |
| | I1 | 11.4 | 1.57 | 18 | Good | 1.7 | 1.62 |
| | I2 | 9.9 | 1.00 | 15 | Good | 1.7 | 1.60 |
| | D1-A | 20.8 | 1.10 | 20 | Poor | 1.7 | 8.35 |
| | D1-B | 16.2 | 0.23 | 20 | Poor | 0.5 | 8.53 |

Many interesting and unexpected conclusions are seen in the above-tabulated data. Initially, it will be observed that the contact angle appears to be a function of the oxygen content on the surface of the substrate. Since no oxygen uptake occurs by the inventive process, the inventive fluorinate surface is less sensitive to water. The stain resistance test bears witness to this conclusion.

Next, the haze test is seen to be a bulk property directly related to the $CF_2$/CHF ratio and substantialy independent of the oxygen content at the surface. The key $CF_2$/CHF permissible maximum ratio is different for each substrate, but does appear to vary around a ratio of 1 (eg. ranging from about 0.75 to 1.25 or slightly higher). Thus, for preservation of the bulk physical properties of the substrate, the controlled fluorination process of the instant invention excels.

Moreover, as the scratch resistance test demonstrates, the inventive treated substrates have a more durable surface. In fact, the extended wear of such substrates clearly also is related to the fluorination which occurs under the substrate and into the material itself. Thus, the inventive process provides a unique combination of bulk property preservation, surface durability and hardness, and water resistance.

We claim:

1. A method for fluorinating the surface of a polymeric solid for improving a surface property of said solid while substantially maintaining the bulk physical properties of said solid, which comprises:

contacting said polymeric solid with dilute fluorine gas at a temperature not substantially above about room temperature and at a pressure not above about 1 atmosphere for a time adequate to partially fluorinate said solid surface by forming stable fluorocarbon groups wherein the ratio of —CF$_2$— groups to —CHF— groups is not substantially above about 1:1, the proportion of oxygen-providing groups present during said fluorination being restricted to an amount whereby substantially no oxidation of said surface occurs.

2. The method of claim 1 wherein said fluorination is conducted for a time adequate to partially fluorinate said solid surface without forming substantially any —CF$_2$— groups.

3. The process of claim 1 wherein said dilute fluorine gas comprises not substantially above about 4 percent fluorine gas in a diluent inert gas.

4. The method of claim 3 wherein said inert diluent gas comprises nitrogen.

5. The method of claim 1 wherein said contacting is for a time ranging between about 1 and 30 minutes.

6. The process of claim 1 wherein said polymeric solid is made from a material selected from a silicon resin, a phenolic resin, a polyolefin, a polyvinyl, a polyester, a polyacrylate, a polyether, a polyamide, a polysulfone, a cellulosic, a polycarbonate, a polyepoxide, and a polyacrylonitrile.

7. The method of claim 6 wherein said polymeric solid comprises polymerized ethylene propylene diene monomer.

8. The process of claim 6 wherein said polymeric solid comprises polyvinyl chloride.

9. The method of claim 1 wherein said surface property comprises the oxygen permeability of said polymeric solid.

* * * * *